US012782933B2

(12) United States Patent
Liang et al.

(10) Patent No.: US 12,782,933 B2

(45) Date of Patent: Nov. 3, 2026

(54) AUTOMATIC SYSTEM AND CONTROL METHOD THEREOF

(71) Applicant: Wistron Corp., New Taipei City (TW)

(72) Inventors: Shang Bin Liang, New Taipei City (TW); Shun-Chi Yeh, New Taipei City (TW); Jiang Nan Ma, New Taipei City (TW); Xi Wei Guo, New Taipei City (TW)

(73) Assignee: Wistron Corp., New Taipei City (TW)

( * ) Notice: Subject to any disclaimer, the term of this patent is extended or adjusted under 35 U.S.C. 154(b) by 382 days.

(21) Appl. No.: 18/302,727

(22) Filed: Apr. 18, 2023

(65) Prior Publication Data

US 2024/0272635 A1 Aug. 15, 2024

(30) Foreign Application Priority Data

Feb. 10, 2023 (CN) ......................... 202310103526.1

(51) Int. Cl.
*G05D 1/00* (2024.01)
*G05D 1/02* (2020.01)

(52) U.S. Cl.
CPC ......... *G05D 1/0022* (2013.01); *G05D 1/0276* (2013.01)

(58) Field of Classification Search
CPC ............... G05D 1/0022; G05D 1/0276; G05D 2105/45; G05D 2107/70; G05D 2109/10; G05D 1/225; G05B 19/41895; G05B 2219/32252
See application file for complete search history.

(56) References Cited

U.S. PATENT DOCUMENTS

| | | | | |
|---|---|---|---|---|
| 5,836,068 A * | 11/1998 | Bullen | B23Q 17/24 29/430 |
| 10,919,555 B1 * | 2/2021 | Spruill | B62B 5/0046 |
| 11,590,997 B1 * | 2/2023 | Bhaskaran | B62B 3/1424 |
| 2009/0317217 A1 * | 12/2009 | Nishimura | B66F 9/063 414/222.03 |
| 2014/0169930 A1 * | 6/2014 | Messmann | B66F 9/065 414/800 |
| 2015/0094879 A1 * | 4/2015 | Pari | B25J 11/008 701/2 |
| 2020/0012284 A1 * | 1/2020 | Morita | G05D 1/0212 |
| 2024/0224865 A1 * | 7/2024 | Van Den Berg | A01D 46/30 |

FOREIGN PATENT DOCUMENTS

| | | |
|---|---|---|
| CN | 112573055 A | 3/2021 |
| CN | 114194692 A | 3/2022 |
| CN | 114222708 A | 3/2022 |

* cited by examiner

*Primary Examiner* — Rodney A Butler

(57) ABSTRACT

An automation system includes a controller, an AGV (Automated Guided Vehicle), and a carrier component. The controller generates a control signal, so as to perform a moving process. The AGV receives the control signal. The AGV moves the carrier component from a first location to a second location according to the control signal.

20 Claims, 6 Drawing Sheets

200

AUTOMATIC SYSTEM AND CONTROL METHOD THEREOF

CROSS REFERENCE TO RELATED APPLICATIONS

This application claims priority of China Patent Application No. 202310103526.1 filed on Feb. 10, 2023, the entirety of which is incorporated by reference herein.

BACKGROUND OF THE INVENTION

Field of the Invention

The invention relates to an automation system, and more particularly, to an automation system used in a variety of environments.

Description of the Related Art

In conventional factories, manufacturing cost can often increase due to a defect in an automated process, or the limited application field of an automatic machine. Thus, there is need for a novel solution to the problem of the prior art.

BRIEF SUMMARY OF THE INVENTION

In an exemplary embodiment, the invention is directed to an automation system that includes a controller, an AGV (Automated Guided Vehicle), and a carrier component. The controller generates a control signal, so as to perform a moving process. The AGV receives the control signal. The AGV moves the carrier component from a first location to a second location according to the control signal.

In some embodiments, the control signal is a wireless signal, and is propagated through a WLAN (Wireless Local Area Network) or a mobile network.

In some embodiments, the automation system further includes a display device coupled to the controller. The controller shows a UI (User Interface) on the display device, so as to indicate the operating state of the AGV.

In some embodiments, the moving process comprises an SMT (Surface Mount Technology) material preparation process, a PCB (Printed Circuit Board) online process, a jig online process, a resource recycling process, a product storage process, and/or an MB (Mother Board) warehousing process.

In some embodiments, the AGV includes a wireless communication system, a wheel module, and a control module. The wireless communication system receives the control signal. The control module is coupled to the wireless communication system and the wheel module. The control module drives the wheel module according to the control signal.

In some embodiments, the carrier component is capable of being unloaded from the AGV.

In some embodiments, the carrier component is a trolley or a shelf.

In some embodiments, the carrier component is configured to accommodate an object.

In some embodiments, the carrier component is initially empty, and then the object is put into the carrier component.

In some embodiments, the object is previously put in the carrier component.

In some embodiments, the object comprises an SMT material, a PCB, a jig, a waste, a product, and/or an MB.

In another exemplary embodiment, the invention is directed to a control method that includes the following steps: generating a control signal via a controller, so as to perform a moving process; receiving the control signal via an AGV; and moving the carrier component from a first location to a second location via the AGV according to the control signal.

In some embodiments, the control method further includes: showing a UI on a display device via the controller, so as to indicate the operating state of the AGV.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
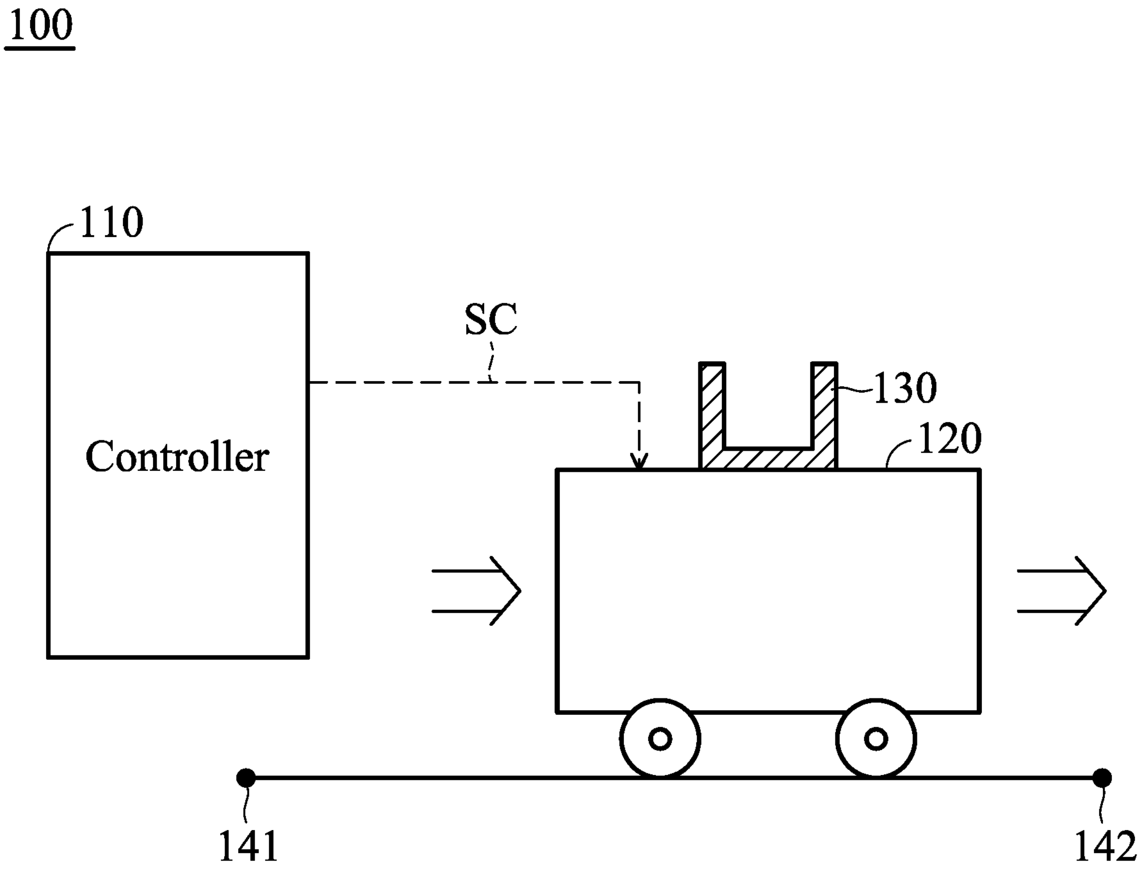
FIG. 1 is a diagram of an automation system according to an embodiment of the invention.

In order to illustrate the foregoing and other purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an automation system 100 according to an embodiment of the invention. For example, the automation system 100 can be applied in a factory production line, but it is not limited thereto. As shown in FIG. 1, the automation system 100 at least includes a controller 110, an AGV (Automated Guided Vehicle) 120, and a carrier component 130. It should be understood that the automation system 100 can further include other components, such as a power supply module, a robotic arm, and/or a plurality of tracks, although they are not shown in FIG. 1.

The controller 110 can be considered as a central control unit of the automation system 100, and it can be implemented with hardware circuits and software programs. The controller 110 generates a control signal SC, so as to perform a moving process. For example, the control signal SC can be a wireless signal, which can be propagated through a WLAN (Wireless Local Area Network) or a mobile network. In some embodiments, the controller 110 of the automation system 100 further performs a control process so as to generates a control instruction, and also delivers a control command to a third-party control system. The aforementioned mobile network may be a 5G (5th Generation Mobile Network) communication. The AGV 120 receives the control signal SC. The carrier component 130 can be disposed on the AGV 120. The shapes and types of the AGV 120 and the carrier component 130 are not limited in the invention. For example, the carrier component 130 can be a trolley or a shelf. It should be noted that the carrier component 130 is not a fixed element, and the carrier component 130 can be unloaded from the AGV 120. Generally, the AGV 120 can move the carrier component 130 from a first location 141 to a second location 142 according to the control signal SC. The first location 141 and the second location 142 can be different from each other. With this design, the proposed automation system 100 of the invention is used for general purposes, and it can be easily applied in a variety of work environments, thereby reducing the overall manufacturing cost.

The following embodiments will introduce different configurations and detail structural features of the automation system 100. It should be understood that these figures and descriptions are merely exemplary, rather than limitations of the invention.

Figure 2:
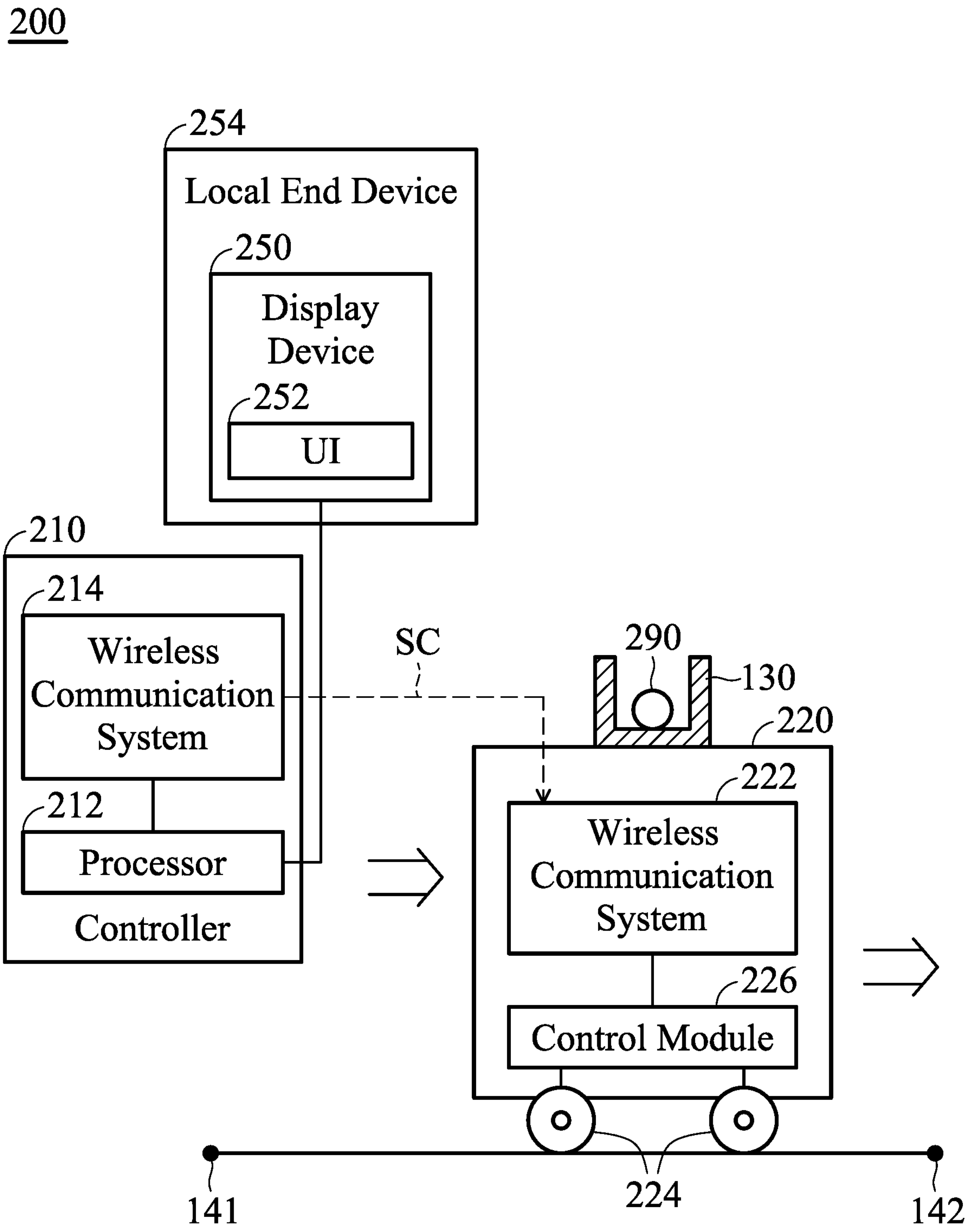
FIG. 2 is a diagram of an automation system according to an embodiment of the invention.

FIG. 2 is a diagram of an automation system 200 according to an embodiment of the invention. FIG. 2 is similar to FIG. 1. In the embodiment of FIG. 2, a controller 210 of the automation system 200 includes a processor 212 and a wireless communication system 214, and an AGV 220 of the automation system 200 includes a wireless communication system 222, a wheel module 224, and a control module 226. In some embodiments, the aforementioned processor 212 is also called as a server. Furthermore, the automation system 200 can further include a display device 250, which is coupled to the processor 212 of the controller 210. For example, the display device 250 can include a touch control panel, but it is not limited thereto.

In some embodiments, the display device 250 is disposed inside a local end device 254. In an embodiment, the local end device 254 is implemented with a server, a notebook, or another electronic device carrying the display device 250.

In some embodiments, the carrier component 130 of the automation system 200 is configured to accommodate an object 290. However, the object 290 is not any part of the automation system 200. For example, the carrier component 130 can be initially empty, and then the object 290 can be put into the carrier component 130. Alternatively, the object 290 can be previously put in the carrier component 130, but it is not limited thereto. The shape and type of the object 290 are not limited in the invention, and they are described in detail in the following embodiments.

In the controller 210, the processor 212 can control the wireless communication system 214 to transmit a control signal SC. For example, the processor 212 can be manually triggered, or can be triggered by instructions from other machines, so as to generate the aforementioned control signal SC, but it is not limited thereto. In the AGV 220, the wireless communication system 222 receives the control signal SC, the control module 226 are respectively coupled to the wireless communication system 222 and the wheel module 224, and the control module 226 can drive the wheel module 224 according to the control signal SC. For example, the rotating and moving directions of the wheel module 224 can be determined according to the control signal SC. In addition, the processor 212 of the controller 210 can show a UI (User Interface) 252 on the display device 250, so as to indicate the operating state of the AGV 220. For example, the UI 252 can indicate whether the AGV 220 operates in an idle mode or a work mode, but it is not limited thereto. Furthermore, relative operators can reversely use the UI 252 to manually operate the controller 210. Other features of the automation system 200 of FIG. 2 are similar to those of the automation system 100 of FIG. 1. Accordingly, the two embodiments can achieve similar operating effects.

Figure 3:
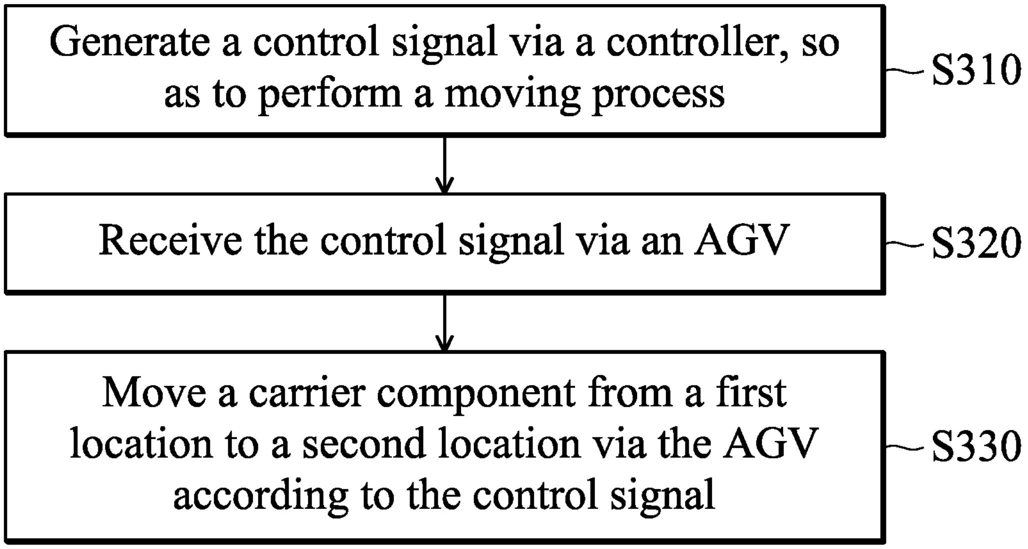
FIG. 3 is a flowchart of a control method according to an embodiment of the invention.

FIG. 3 is a flowchart of a control method according to an embodiment of the invention, and it corresponds the automation systems 100 and 200 of FIGS. 1 and 2. To begin, in step S310, a control signal is generating by a controller, so as to perform a moving process. In step S320, the control signal is received by an AGV. Finally, in step S330, a carrier component is moved from a first location to a second location by the AGV according to the control signal. In some embodiments, the control signal generated by the aforementioned controller can be used to schedule a third-party task template (e.g., a manual control panel), but it is not limited thereto. It should be understood that these steps are not required to be performed in order, and every feature of the embodiments of FIGS. 1-2 may be applied to the control method of FIG. 3.

Figure 4:
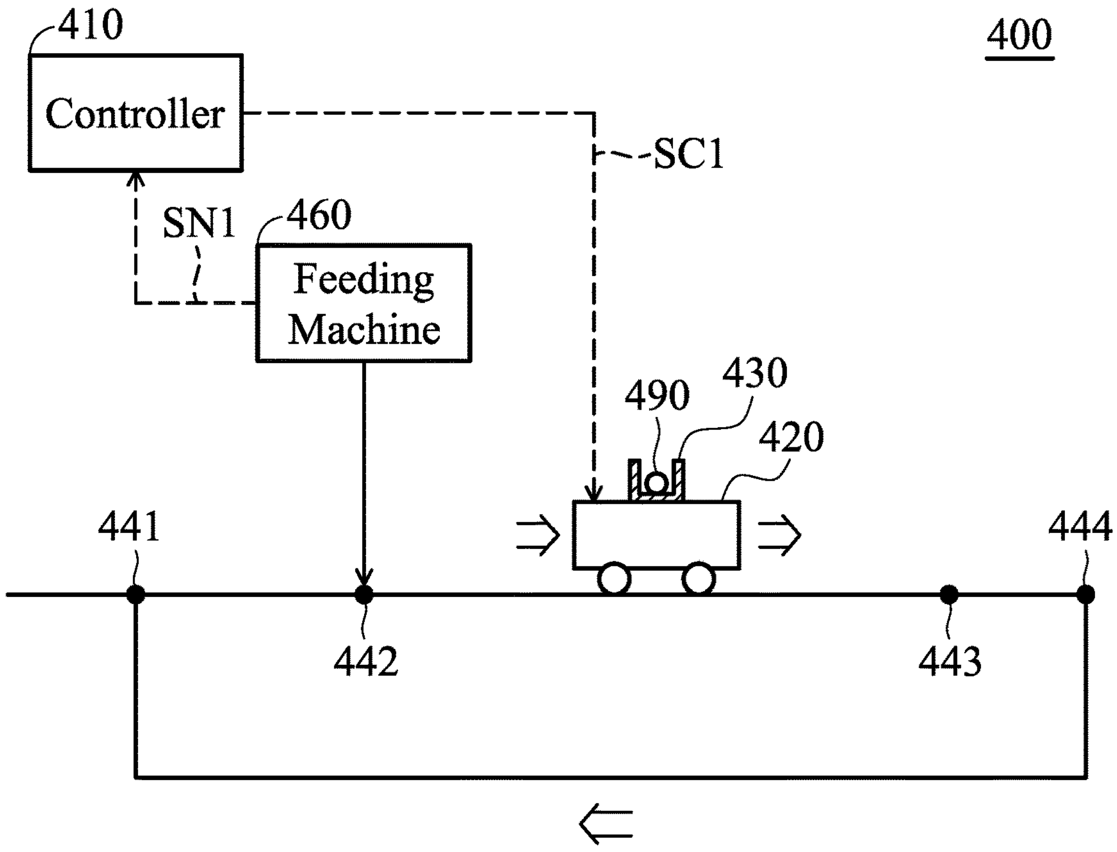
FIG. 4 is a diagram of an automation system according to an embodiment of the invention.

FIG. 4 is a diagram of an automation system 400 according to an embodiment of the invention. In the embodiment of FIG. 4, the automation system 400 includes a controller 410, an AGV 420, a carrier component 430, and a feeding machine 460. The controller 410 generates a control signal SC1, so as to perform a moving process. The aforementioned moving process may be an SMT (Surface Mount Technology) material preparation process. The AGV 420 can move the carrier component 430 according to the control signal SC1. The carrier component 430 can be unloaded from the AGV 420. The carrier component 430 is configured to accommodate an object 490. For example, the carrier component 430 can be an SMT material preparation trolley, and the object 490 can be an SMT material. The feeding machine 460 is configured to automatically distribute one or more SMT materials.

In the beginning, the feeding machine 460 transmits a notification signal SN1 to the controller 410. In response to the notification signal SN1, the controller 410 can control the AGV 420 to go to an empty car meeting point 441 and obtain an empty carrier component 430. In some embodiments, if the automation system 400 includes a plurality of AGVs 420, the controller 410 can select one of the AGVs 420, and the selected AGV 420 may be idle and adjacent to the empty car meeting point 441, but it is not limited thereto. Next, the AGV 420 moves the carrier component 430 to a first feeding point 442, and the feeding machine 460 puts the object 490 into the carrier component 430. In addition, the AGV 420 may further move the carrier component 430 to a second feeding point 443, and may temporarily stop (or automatically stop, which may be set by the system) at the second feeding point 443 for a first predetermined time. During the first predetermined time, other SMT materials can be manually put into the carrier component 430. Next, the AGV 420 moves the full carrier component 430 to a production line operating point 444, and temporarily stops (or automatically stops, which may be set by the system) at the production line operating point 444 for a second predetermined time. During the second predetermined time, a production line operator obtains everything in the carrier component 430, including the aforementioned object 490. Finally, when the second predetermined time expires, the AGV 420 can move the empty carrier component 430 back to the empty car meeting point 441.

Figure 5:
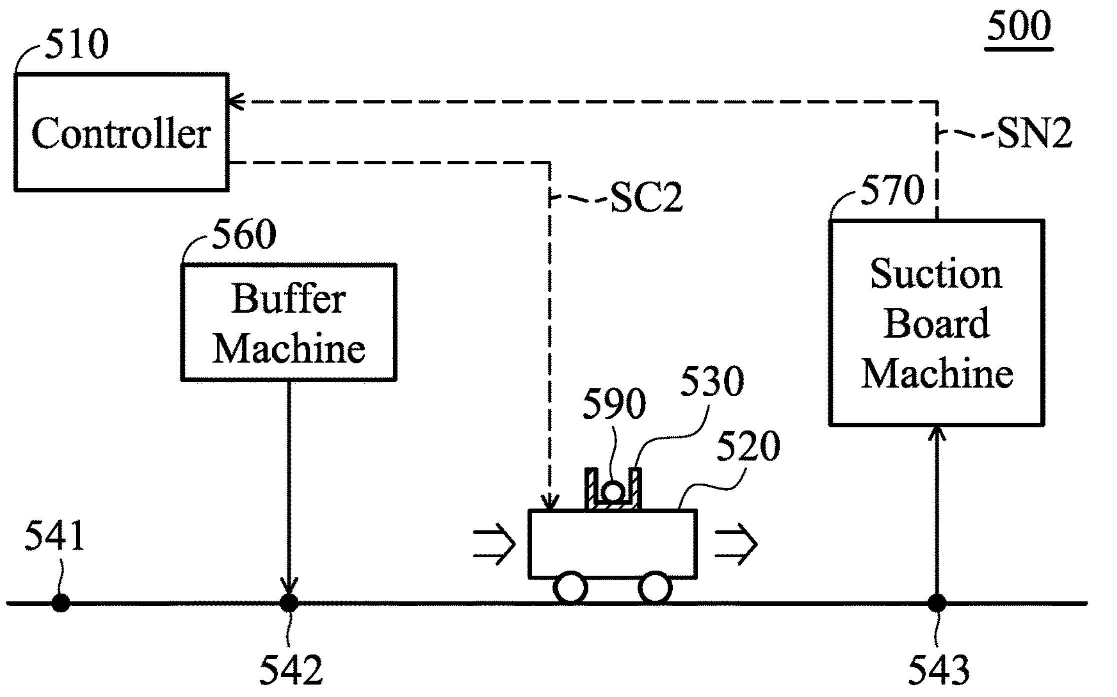
FIG. 5 is a diagram of an automation system according to an embodiment of the invention.

FIG. 5 is a diagram of an automation system 500 according to an embodiment of the invention. In the embodiment of FIG. 5, the automation system 500 includes a controller 510, an AGV 520, a carrier component 530, a buffer machine 560, and a suction board machine 570. The controller 510 generates a control signal SC2, so as to perform a moving process. The aforementioned moving process may be a PCB (Printed Circuit Board) online process. In some embodiments, the controller 510 is manually triggered, or is triggered by instructions from other machines, so as to generate the aforementioned control signal SC2. The AGV 520 can move the carrier component 530 according to the control signal SC2. The carrier component 530 can be unloaded from the AGV 520. The carrier component 530 is configured to accommodate an object 590. For example, the carrier component 530 may be a board feeder, and the object 590 may be a PCB. The buffer machine 560 is configured to automatically transmit one or more PCBs, and the suction board machine 570 is configured to automatically receive one or more PCBs.

In the beginning, when the suction board machine 570 detects that its storage slot is empty (or all PCBs are used up), the suction board machine 570 transmits a notification signal SN2 to the controller 510 via a wireless communication system (not shown). In response to the notification signal SN2, the controller 510 can control the AGV 520 to go to a temporary storage point 541 and obtain an empty carrier component 530. In some embodiments, if the automation system 500 includes a plurality of AGVs 520, the controller 510 can select one of the AGVs 520, and the selected AGV 520 may be idle and adjacent to the temporary storage point 541, but it is not limited thereto. Next, the AGV 520 moves the carrier component 530 to a first operating point 542, and the buffer machine 560 puts the object 590 into the carrier component 530. Finally, the AGV 520 moves the carrier component 530 to a second operating point 543, and the storage slot of the suction board machine 570 can be replenished with the object 590. For example, the carrier component 530 may use a self-transplanting mechanism (not shown) to output the object 590 into the storage slot of the suction board machine 570, but it is not limited thereto.

Figure 6:
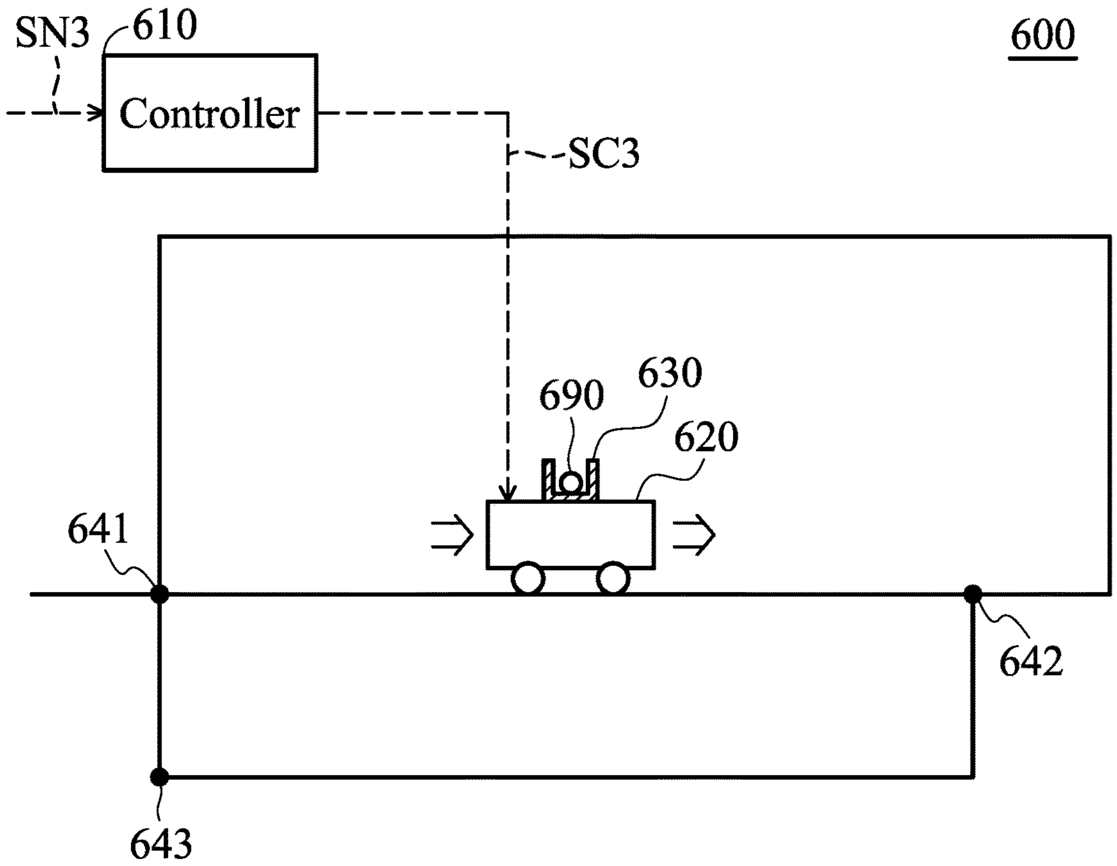
FIG. 6 is a diagram of an automation system according to an embodiment of the invention.

FIG. 6 is a diagram of an automation system 600 according to an embodiment of the invention. In the embodiment of FIG. 6, the automation system 600 includes a controller 610, an AGV 620, and a carrier component 630. The controller 610 generates a control signal SC3, so as to perform a moving process. The aforementioned moving process can be a jig online process. The AGV 620 can move the carrier component 630 according to the control signal SC3. The carrier component 630 can be unloaded from the AGV 620. The carrier component 630 is configured to accommodate an object 690. For example, the carrier component 630 can be a jig trolley, and the object 690 can be a jig.

Initially, the object 690 is previously put in the carrier component 630 by a jig room operator. In addition, when some jigs are needed, a production line operator can use a PC (Personal Computer) operation interface (not shown) to transmit a notification signal SN3 to the controller 610. As mentioned above, the controller 610 may also be called as a server. In response to the notification signal SN3, the controller 610 can control the AGV 620 to go to a jig room point 641 and obtain the full carrier component 630. In some embodiments, if the automation system 600 includes a plurality of AGVs 620, the controller 610 can select one of the AGVs 620, and the selected AGV 620 may be idle and adjacent to the jig room point 641, but it is not limited thereto. Next, the AGV 620 moves the carrier component 630 to a production line operating point 642, and temporarily stops at the production line operating point 642 for a first predetermined time. During the first predetermined time, the production line operator obtains everything in the carrier component 630, including the aforementioned object 690. Finally, the AGV 620 moves the empty carrier component 630 back to the jig room point 641.

Alternatively, when some jigs need recycling, a production line operator can use the aforementioned PC operation interface to transmit another notification signal SN3 to the controller 610. In response to the notification signal SN3, the controller 610 can control the AGV 620 to go to an empty car meeting point 643 and obtain an empty carrier component 630. In some embodiments, if the automation system 600 includes a plurality of AGVs 620, the controller 610 can select one of the AGVs 620, and the selected AGV 620 can be idle and adjacent to the empty car meeting point 643, but it is not limited thereto. Next, the AGV 620 moves the carrier component 630 to the production line operating point 642, and temporarily stops at the production line operating point 642 for a second predetermined time. During the second predetermined time, the production line operator manually puts the jigs to be recycled into the carrier component 630. Finally, the AGV 620 moves the full carrier component 630 back to the jig room point 641. In some embodiments, the aforementioned the production line operating point 642 includes a plurality of sub-stopping points (not shown), such as 5 sub-stopping points, which may be operated by multiple production line operators.

Figure 7:
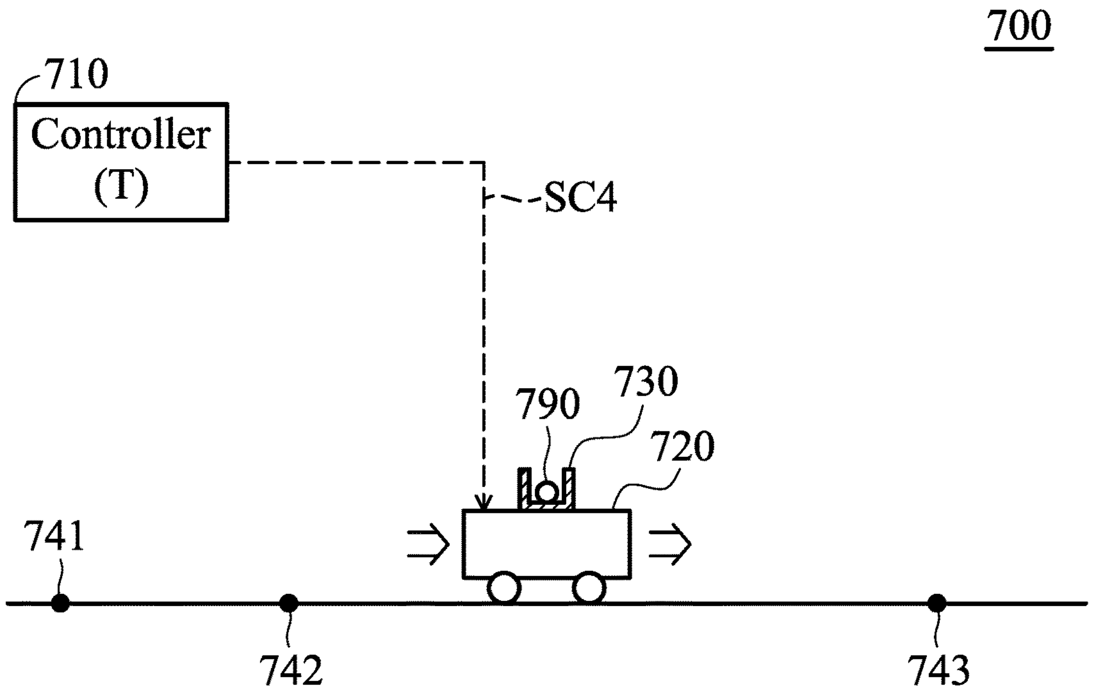
FIG. 7 is a diagram of an automation system according to an embodiment of the invention.

FIG. 7 is a diagram of an automation system 700 according to an embodiment of the invention. In the embodiment of FIG. 7, the automation system 700 includes a controller 710, an AGV 720, and a carrier component 730. As mentioned above, the controller 710 is called as a server. The controller 710 generates a control signal SC4, so as to perform a moving process. The aforementioned moving process can be a resource recycling process. The AGV 720 can move the carrier component 730 according to the control signal SC4. The carrier component 730 can be unloaded from the AGV 720. The carrier component 730 is configured to accommodate an object 790. For example, the carrier component 730 can be a recycling trolley, and the object 790 can be a waste. It should be understood that the type of the aforementioned waste is not limited in the invention.

At intervals of a periodical time T (e.g., 4 hours or 8 hours), the controller 710 can control the AGV 720 to go to an empty car meeting point 741 and obtain an empty carrier component 730. Next, the AGV 720 moves the carrier component 730 to a production line recycling point 742, and temporarily stops at the production line recycling point 742 for a predetermined time. During the predetermined time, a production line operator puts the object 790 into the carrier component 730. For example, the object 790 may be an SMT waste or a board waste, but it is not limited thereto. When the predetermined time expires, the AGV 720 moves the carrier component 730 and the object 790 thereon to a recycling room operating point 743 for subsequent garbage disposal.

Figure 8:
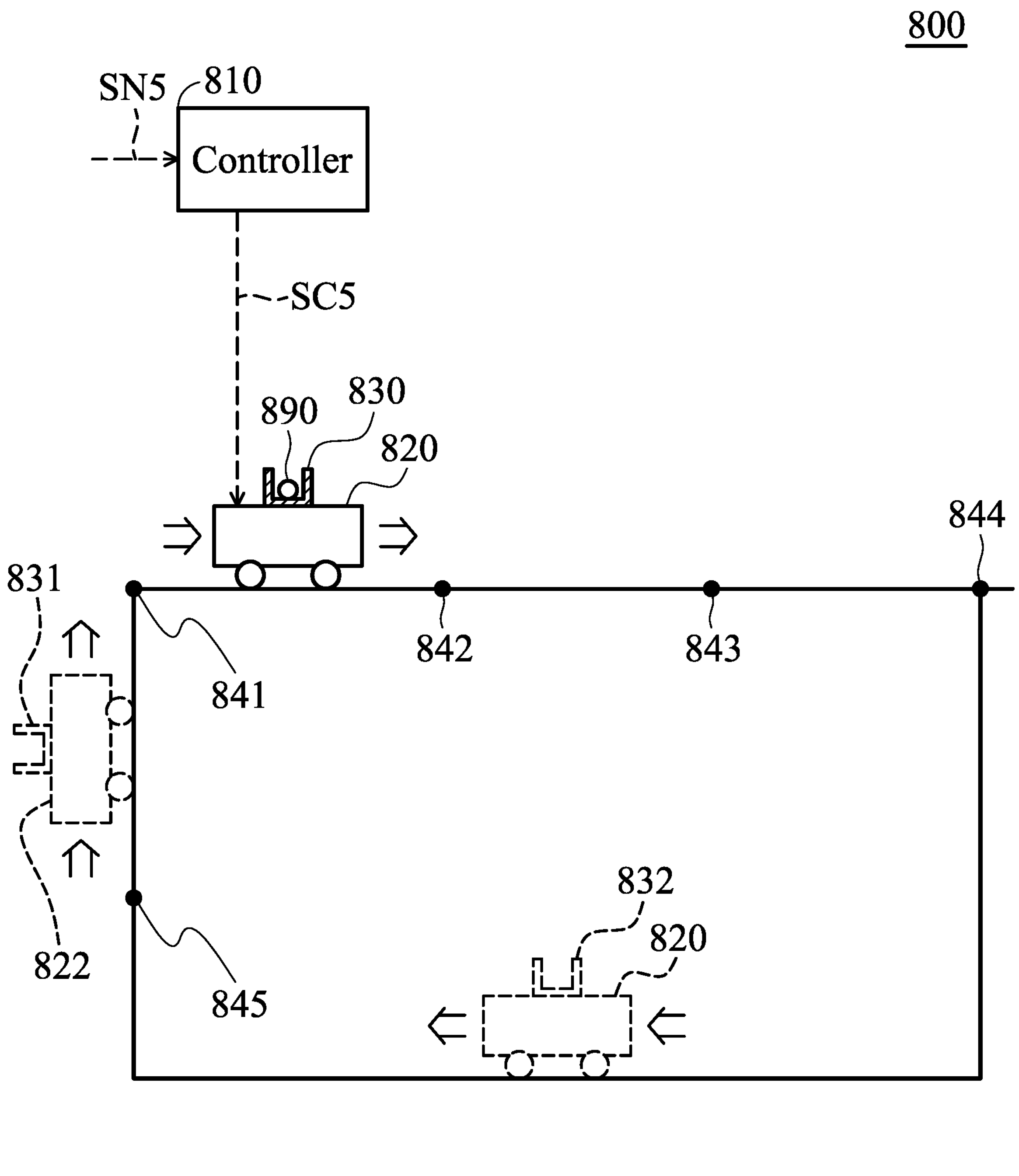
FIG. 8 is a diagram of an automation system according to an embodiment of the invention.

FIG. 8 is a diagram of an automation system 800 according to an embodiment of the invention. In the embodiment of FIG. 8, the automation system 800 includes a controller 810, an AGV 820, and a carrier component 830. The controller 810 generates a control signal SC5, so as to perform a moving process. The aforementioned moving process can be a product storage process. The AGV 820 can move the carrier component 830 according to the control signal SC5. The carrier component 830 can be unloaded from the AGV 820. The carrier component 830 is configured to accommodate an object 890. For example, the carrier component 830 may be a storage trolley, and the object 890 can be a product.

Initially, the object 890 is previously put in the carrier component 830 by a robotic arm. In addition, the robotic arm can transmit a notification signal SN5 to the controller 810. In response to the notification signal SN5, the controller 810 can control the AGV 820 to go to a meeting point 841 and obtain the full carrier component 830. In some embodiments, if the automation system 800 includes a plurality of AGVs 820, the controller 810 can select one of the AGVs 820, and the selected AGV 820 can be idle and adjacent to the meeting point 841, but it is not limited thereto. After the carrier component 830 is moved by the AGV 820, a vacant position is left at the meeting point 841. At this time, in alternative embodiments, another AGV 822 goes to an empty car meeting point 845 and obtains another carrier component 831, thereby filling the vacant position at the meeting point 841. Next, the AGV 820 moves the carrier component 830 to a check point 842. At this time, all products in the carrier component 830 can be automatically scanned and/or manually scanned for inventory. Then, the AGV 820 further moves the carrier component 830 to a warehousing point 843. And, the AGV 820 leaves the carrier component 830 and the object 890 thereon at a target position of the warehousing point 843. Finally, the AGV 820 goes to another empty car meeting point 844 and obtains another empty carrier component 832, and then moves the empty carrier component 832 back to the aforementioned empty car meeting point 845. According to practical measurements, this design can help to significantly reduce the operating and waiting time of the automation system 800.

In alternative embodiments, the embodiment of FIG. 8 is also used to perform an MB (Mother Board) warehousing process. The aforementioned carrier component 830 may be an MB trolley, and the object 890 can be an MB. Other features of the MB warehousing process are similar to those of the product storage process. Accordingly, the two embodiments can achieve operating effects.

The invention proposed a novel automation system and a novel control method, which can be used for general purposes and easily applied in a variety of different work environments. In comparison to the conventional design, the invention has at least the advantage of significantly reducing the overall manufacturing cost. Therefore, the invention is suitable for application in a variety of production lines.

Note that the above element parameters are not limitations of the invention. A designer can fine-tune these setting values according to different requirements. It should be understood that the automation system and the control method of the invention are not limited to the configurations of FIGS. 1-8. The invention may include any one or more features of any one or more embodiments of FIGS. 1-8. In other words, not all of the features displayed in the figures should be implemented in the automation system and the control method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. An automation system, comprising:

a controller, generating a control signal, so as to perform a moving process;

an AGV (Automated Guided Vehicle), receiving the control signal; and a carrier component;

wherein the AGV moves the carrier component from a first location to a second location according to the control signal;

wherein the automation system further comprises:

a display device, coupled to the controller, wherein the controller shows a UI (User Interface) on the display device, so as to indicate an operating state of the AGV;

wherein the UI indicates whether the AGV operates in an idle mode or a work mode according to the control signal;

wherein the moving process comprises a PCB (Printed Circuit Board) online process, a resource recycling process, and/or an MB (Mother Board) warehousing process.

2. The automation system as claimed in claim 1, wherein the control signal is a wireless signal, and is propagated through a WLAN (Wireless Local Area Network) or a mobile network.

3. The automation system as claimed in claim 1, wherein the AGV comprises:

a wireless communication system, receiving the control signal;

a wheel module; and a control module, coupled to the wireless communication system and the wheel module, wherein the control module drives the wheel module according to the control signal.

4. The automation system as claimed in claim 1, wherein the carrier component is capable of being unloaded from the AGV.

5. The automation system as claimed in claim 1, wherein the carrier component is a trolley or a shelf.

6. The automation system as claimed in claim 1, wherein the carrier component is configured to accommodate an object.

7. The automation system as claimed in claim 6, wherein the carrier component is initially empty, and then the object is put into the carrier component.

8. The automation system as claimed in claim 6, wherein the object is previously put in the carrier component.

9. The automation system as claimed in claim 6, wherein the object comprises an SMT material, a PCB, a jig, a waste, a product, and/or an MB.

10. A control method, comprising:

generating a control signal via a controller, so as to perform a moving process;

receiving the control signal via an AGV (Automated Guided Vehicle);

moving a carrier component from a first location to a second location via the AGV according to the control signal; and showing a UI (User Interface) on a display device via the controller, so as to indicate an operating state of the AGV;

wherein the UI indicates whether the AGV operates in an idle mode or a work mode according to the control signal;

wherein the moving process comprises a PCB (Printed Circuit Board) online process, a resource recycling process, and/or an MB (Mother Board) warehousing process.

11. The control method as claimed in claim 10, wherein the control signal is a wireless signal, and is propagated through a WLAN (Wireless Local Area Network) or a mobile network.

12. The control method as claimed in claim 10, wherein the carrier component is capable of being unloaded from the AGV.

13. The control method as claimed in claim 10, wherein the carrier component is configured to accommodate an object.

14. The control method as claimed in claim 13, wherein the carrier component is initially empty, and then the object is put into the carrier component.

15. The control method as claimed in claim 13, wherein the object is previously put in the carrier component.

16. The control method as claimed in claim 13, wherein the object comprises an SMT material, a PCB, a jig, a waste, a product, and/or an MB.

17. The automation system as claimed in claim 7, wherein at intervals of a periodical time, the controller controls the AGV to go to an empty car meeting point and obtain the empty carrier component.

18. The control method as claimed in claim 14, further comprising:

at intervals of a periodical time, controlling the AGV to go to an empty car meeting point and obtain the empty carrier component via the controller.

19. The automation system as claimed in claim 1, wherein the carrier component is a board feeder, and the object comprises one or more PCBs.

20. The automation system as claimed in claim 19, further comprising:

a buffer machine, automatically transmitting the one or more PCBs; and a suction board machine, automatically receiving the one or more PCBs.

* * * * *